US012504294B2

(12) United States Patent
Fukui et al.

(10) Patent No.: US 12,504,294 B2
(45) Date of Patent: Dec. 23, 2025

(54) INFORMATION PROVIDING DEVICE, INFORMATION PROVIDING METHOD, AND INFORMATION PROVIDING PROGRAM FOR ACQUIRING GUIDANCE LOCATION INFORMATION INDICATING DISTANCE BETWEEN POSITION OF RECIPIENT AND POSITION OF GUIDANCE LOCATION

(71) Applicant: PIONEER CORPORATION, Tokyo (JP)

(72) Inventors: Kotaro Fukui, Saitama (JP); Masahiro Iwata, Saitama (JP); Shinichiro Iino, Saitama (JP); Shota Izumi, Saitama (JP); Yohei Onuma, Saitama (JP)

(73) Assignee: PIONEER CORPORATION, Tokyo (JP)

( * ) Notice: Subject to any disclaimer, the term of this patent is extended or adjusted under 35 U.S.C. 154(b) by 0 days.

(21) Appl. No.: 17/756,112

(22) PCT Filed: Jan. 14, 2021

(86) PCT No.: PCT/JP2021/000993
§ 371 (c)(1),
(2) Date: May 17, 2022

(87) PCT Pub. No.: WO2021/192520
PCT Pub. Date: Sep. 30, 2021

(65) Prior Publication Data
US 2023/0358556 A1 Nov. 9, 2023

(30) Foreign Application Priority Data
Mar. 27, 2020 (JP) ................. 2020-058573

(51) Int. Cl.
*G01C 21/36* (2006.01)
*G06F 3/16* (2006.01)
*G10L 15/22* (2006.01)

(52) U.S. Cl.
CPC .......... *G01C 21/3629* (2013.01); *G06F 3/16* (2013.01); *G10L 15/22* (2013.01)

(58) Field of Classification Search
CPC ... G01C 21/3629; G01C 21/3655; G06F 3/16; G10L 15/22
See application file for complete search history.

(56) References Cited

U.S. PATENT DOCUMENTS 6,317,687 B1 * 11/2001 Morimoto ........... B60R 16/0373
701/443
6,415,225 B1 * 7/2002 Hiyokawa ........ G08G 1/096894
701/428

(Continued)

FOREIGN PATENT DOCUMENTS

JP 2004-117094 A 4/2004
JP 2006-064672 A 3/2006

(Continued)

OTHER PUBLICATIONS

Patent Cooperation Treaty, International Search Report, Application No. PCT/JP2021/000993, dated Mar. 22, 2021, In 4 pages.

*Primary Examiner* — Kenny Nguyen
(74) *Attorney, Agent, or Firm* — PROCOPIO, CORY, HARGREAVES & SAVITCH LLP

(57) ABSTRACT

An information providing device is provided which can provide necessary guidance in an intuitively and easy-to-recognize form even when guidance is mainly by audio or sound.

In searching for a route destination, when the distance to the destination is within a prescribed distance, guidance that includes information indicating the distance to the destina- (Continued)

tion is provided by audio, and when the destination is farther than said prescribed distance, guidance that includes address information indicating the address of the destination is provided by audio (steps S28, S30, S17).

8 Claims, 4 Drawing Sheets

(56) References Cited

U.S. PATENT DOCUMENTS

| | | | | |
|---|---|---|---|---|
| 6,446,001 | B1* | 9/2002 | Sakai | G01C 21/3629 |
| | | | | 381/86 |
| 9,074,909 | B2* | 7/2015 | Ozaki | G01C 21/3644 |
| 9,182,243 | B2* | 11/2015 | van Os | G01C 21/3415 |
| 9,418,672 | B2* | 8/2016 | Pylappan | G06F 3/0488 |
| 10,023,204 | B1* | 7/2018 | Kim | B60W 30/095 |
| 10,029,696 | B1* | 7/2018 | Ferguson | B60W 50/14 |
| 10,156,455 | B2* | 12/2018 | Bennett | H04R 5/00 |
| 10,488,919 | B2* | 11/2019 | George-Svahn | G06F 1/1626 |
| 10,900,800 | B2* | 1/2021 | Herbst | G01C 21/3658 |
| 2004/0107048 | A1* | 6/2004 | Yokota | G01C 21/343 |
| | | | | 701/431 |
| 2007/0164854 | A1* | 7/2007 | Hill | B60Q 9/00 |
| | | | | 116/28 R |
| 2010/0106406 | A1* | 4/2010 | Hille | G01C 21/34 |
| | | | | 701/467 |
| 2010/0185445 | A1* | 7/2010 | Comerford | G10L 15/22 |
| | | | | 704/E15.001 |
| 2013/0006518 | A1* | 1/2013 | Ozaki | G01C 21/3644 |
| | | | | 701/411 |
| 2013/0245939 | A1* | 9/2013 | Chang | G01C 21/26 |
| | | | | 701/527 |
| 2013/0268269 | A1 | 10/2013 | Schalk | |
| 2014/0316696 | A1* | 10/2014 | Chen | G08G 1/0969 |
| | | | | 701/439 |
| 2015/0331081 | A1* | 11/2015 | Wharton | G01S 3/046 |
| | | | | 342/443 |
| 2016/0026431 | A1* | 1/2016 | Yi | G06F 3/0346 |
| | | | | 345/156 |
| 2017/0370735 | A1* | 12/2017 | Salowitz | G08G 1/123 |
| 2018/0112986 | A1* | 4/2018 | Putnam | G01C 19/36 |
| 2018/0299288 | A1* | 10/2018 | Herbst | G06F 16/638 |
| 2018/0299289 | A1* | 10/2018 | Hill | H04W 4/024 |
| 2021/0094538 | A1* | 4/2021 | Beller | B60W 40/04 |
| 2021/0224557 | A1* | 7/2021 | Miyagawa | G01C 21/30 |
| 2022/0301432 | A1* | 9/2022 | Fukui | G08G 1/096872 |
| 2023/0003538 | A1* | 1/2023 | Fukui | G06V 20/56 |
| 2023/0011189 | A1* | 1/2023 | Ogino | G01C 21/3629 |

FOREIGN PATENT DOCUMENTS

| | | |
|---|---|---|
| JP | 2007-163226 A | 6/2007 |
| JP | 2018-081102 A | 5/2018 |

* cited by examiner

INFORMATION PROVIDING DEVICE, INFORMATION PROVIDING METHOD, AND INFORMATION PROVIDING PROGRAM FOR ACQUIRING GUIDANCE LOCATION INFORMATION INDICATING DISTANCE BETWEEN POSITION OF RECIPIENT AND POSITION OF GUIDANCE LOCATION

CROSS-REFERENCE TO RELATED APPLICATIONS

This application is US National Stage of International Patent Application PCT/JP2021/000993, filed Jan. 14, 2021, which claims benefit of priority from Japanese Patent Application JP2020-058573, filed Mar. 27, 2020, the contents of both of which are incorporated herein by reference.

TECHNICAL FIELD

The present application belongs to a technical field of an information providing device, an information providing method, and an information providing program. More specifically, the present application belongs to a technical field of an information providing device, an information providing method, and a program for the information providing device that provide information regarding traveling of a moving body, such as a vehicle.

BACKGROUND ART

As a navigation device that provides the above information regarding traveling of a moving body, a navigation device mounted on a moving body has been widely used in the past. The following Patent Document 1 is an example of a document disclosing a background art related to such a conventional navigation device. In the background art disclosed in Patent Document 1, the navigation device is configured to display an overview of a route for each destination to allow a user select a destination.

Meanwhile, research and development on a navigation system utilizing a portable terminal device, such as a smartphone, in addition to the above navigation device mounted on a moving body have actively proceeded in recent years.

CITATION LIST

Patent Document

Patent Document 1: JP 2006-64672 A

SUMMARY OF THE INVENTION

Problem to be Solved by the Invention

Here, in a case where the above portable terminal device is utilized, guidance using sound including a guidance voice is important due to size limitation of a display of the portable terminal device. In this regard, for example, in the background art disclosed in Patent Document 1, a distance to a destination, address information about the destination, and the like are displayed together using a map, and the destination can be confirmed with these. However, in consideration of the above guidance using sound (in other words, guidance not using display of an image including a map), it is required to provide necessary information including, for example, whether a destination is the destination desired by a person who receives the guidance or the like in a more intuitively recognizable manner.

For this reason, the present application has been made in view of the above requirement, and an example of its purpose is to provide an information providing device, an information providing method, and a program for the information providing device that are capable of providing necessary guidance information in an intuitively recognizable manner even in a case of guidance mainly provided by voice or sound.

Means for Solving the Problem

In order to solve the above-mentioned problem, the invention described in claim 1 comprises: an acquiring means that acquires guidance location information indicating a guidance location for which guidance information is to be provided; and a providing means that provides, when a position of the guidance location indicated by the acquired guidance location information is within a preset distance from a position of a recipient who receives provision of the guidance location information, the guidance information including distance information indicating a distance between the position of the recipient and the position of the guidance location to the recipient by sound and provides, and when the position of the guidance location is farther than the preset distance, the guidance information including address information indicating an address of the guidance location to the recipient by sound.

In order to solve the above-mentioned problem, the invention described in claim 5 comprises: an acquiring means that acquires a voice of a recipient, the voice indicating a guidance location for which provision of guidance information is desired; and a providing means that provides, when a term related to a distance is included in the voice, the guidance information including distance information indicating a distance between a position of the recipient and a position of the guidance location to the recipient by sound and provides, and when a term specifying the position of the guidance location and other than the term related to the distance is included in the voice, the guidance information including address information indicating an address of the guidance location to the recipient by sound.

In order to solve the above-mentioned problem, the invention described in claim 6 is an information providing method performed by an information providing device including an acquiring means and a providing means, the information providing method comprising: an acquiring step, by the acquiring means, of acquiring guidance location information indicating a guidance location for which guidance information is to be provided; and a providing step, by providing means, of providing, when a position of the guidance location indicated by the acquired guidance location information is within a preset distance from a position of a recipient who receives provision of the guidance location information, the guidance information including distance information indicating a distance between the position of the recipient and the position of the guidance location to the recipient by sound and of providing, and when the position of the guidance location is farther than the preset distance, the guidance information including address information indicating an address of the guidance location to the recipient by sound.

In order to solve the above-mentioned problem, the invention described in claim 7 causes a computer to function as: an acquiring means that acquires guidance location information indicating a guidance location for which guidance information is to be provided; and a providing means that provides, when a position of the guidance location indicated by the acquired guidance location information is within a preset distance from a position of a recipient who receives provision of the guidance location information, the guidance information including distance information indicating a distance between the position of the recipient and the position of the guidance location to the recipient by sound and provides, when the position of the guidance location is farther than the preset distance, the guidance information including address information indicating an address of the guidance location to the recipient by sound.

BRIEF DESCRIPTION OF THE DRAWINGS

FIG. 3(*a*) is a block figure showing a schematic configuration of the terminal device, and FIG. 3(*b*) is a block figure showing a schematic configuration of a server in the example.

MODES FOR CARRYING OUT THE INVENTION

Next, an embodiment of the present application will be described with reference to FIG. 1. Note that FIG. 1 is a block figure showing a schematic configuration of an information providing device in an embodiment.

Figure 1:
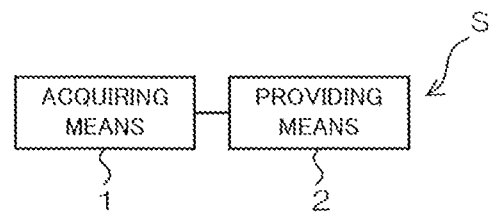
FIG. 1 is a block figure showing a schematic configuration of an information providing device in an embodiment.

As shown in FIG. 1, an information providing device S in the embodiment comprises an acquiring means 1 and a providing means 2.

In this configuration, the acquiring means 1 acquires guidance location information indicating a guidance location for which guidance information is to be provided.

Then, when the position of the guidance location indicated by the guidance location information acquired by the acquiring means 1 is within a preset distance from a position of a recipient who receives provision of the guidance location information, the providing means 2 provides the guidance information including distance information indicating a distance between the position of the recipient and the position of the guidance location to the recipient by sound, and when the position of the guidance location is farther than the above preset distance, the providing means 2 provides the guidance information including address information indicating an address of the guidance location to the recipient by sound.

As described above, according to the operation of the information providing device S in the embodiment, the guidance information including the distance information indicating the distance between the position of the recipient and the position of the guidance location is provided to the recipient by sound when the guidance location is within the preset distance from the position of the recipient, and the guidance information including the address information indicating the address of the guidance location is provided to the recipient by sound when the position of the guidance location is farther than the distance. Thus, it is possible for the information providing device S to provide necessary guidance information in an intuitively recognizable manner even in a case of providing the guidance information by sound. Note that "guidance" in the present embodiment does not include guidance itself, for example, along a route (information provision itself such as "turn left" or "turn right" during guidance), and includes guidance (provision) on information regarding a point or facility that can be a destination, a waypoint, or the like of the guidance.

Exemplary Embodiments

Next, a specific example corresponding to the above-described embodiment will be described with reference to FIGS. 2 to 5. Note that the example described below is an example in a case where the present application is applied to route guidance using sound (voice) in a navigation system including a terminal device and a server that are connected to be able to exchange data with each other via a network, such as the Internet.

Figure 2:
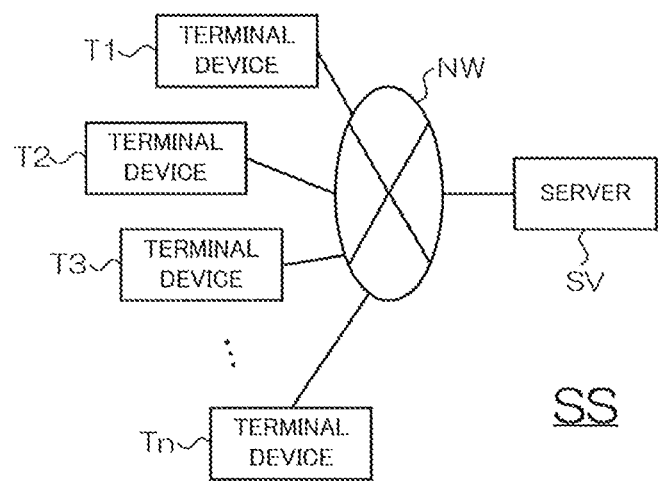
FIG. 2 is a block figure showing a schematic configuration of a navigation system in an example.
Figure 3A:
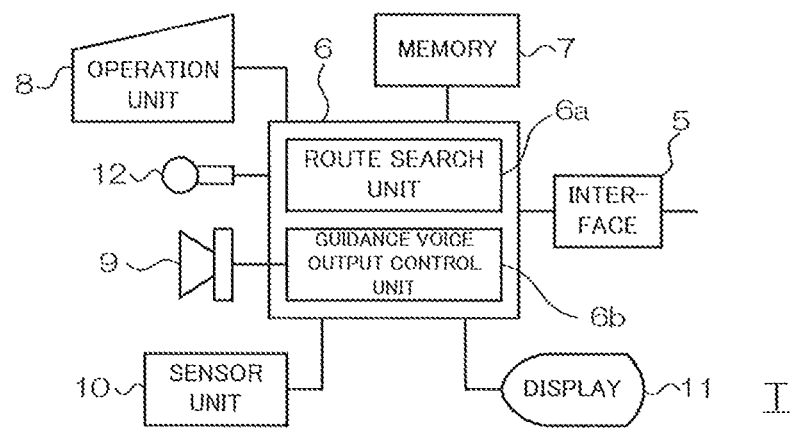
FIG. 3 is a block figure showing a schematic configuration of a terminal device or the like in an example.
Figure 3B:
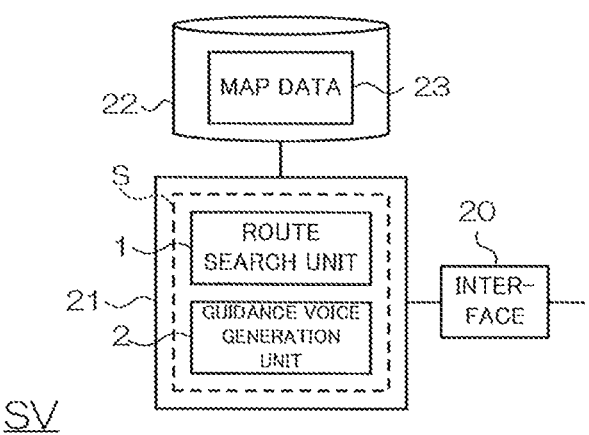
Figure 4:
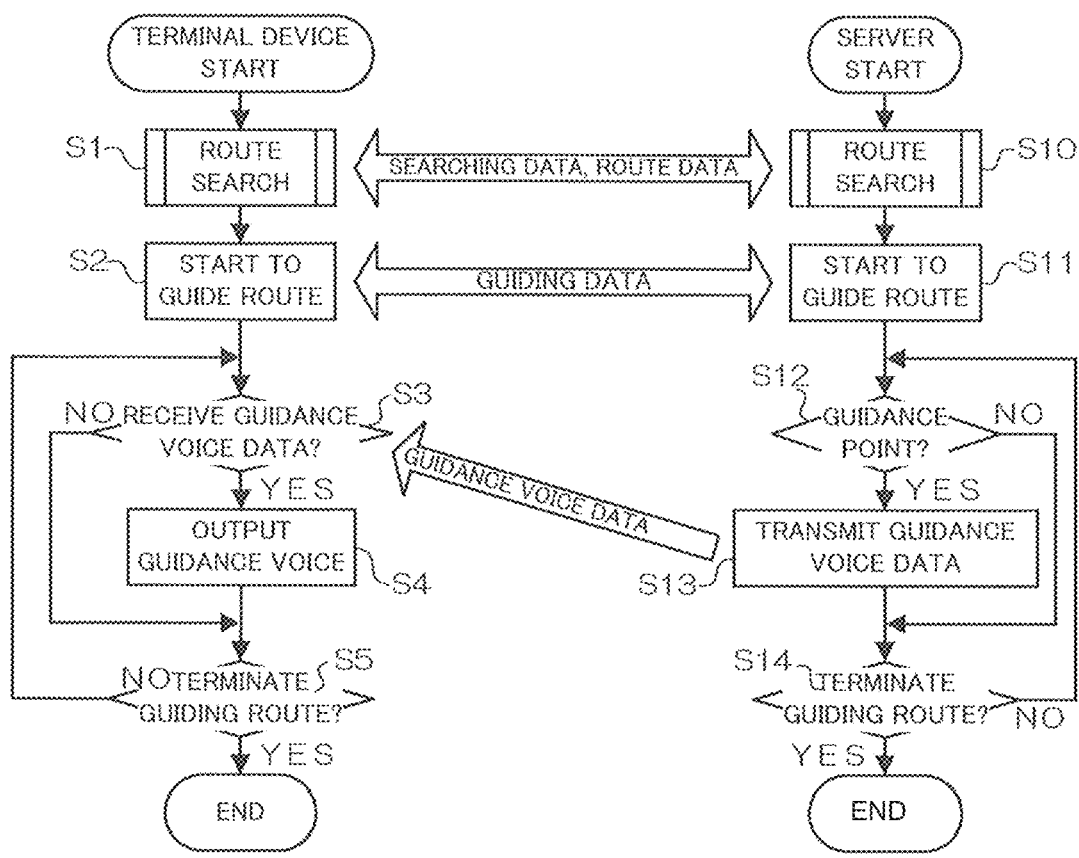
FIG. 4 is a flowchart showing entire navigation processing in an example.
Figure 5:
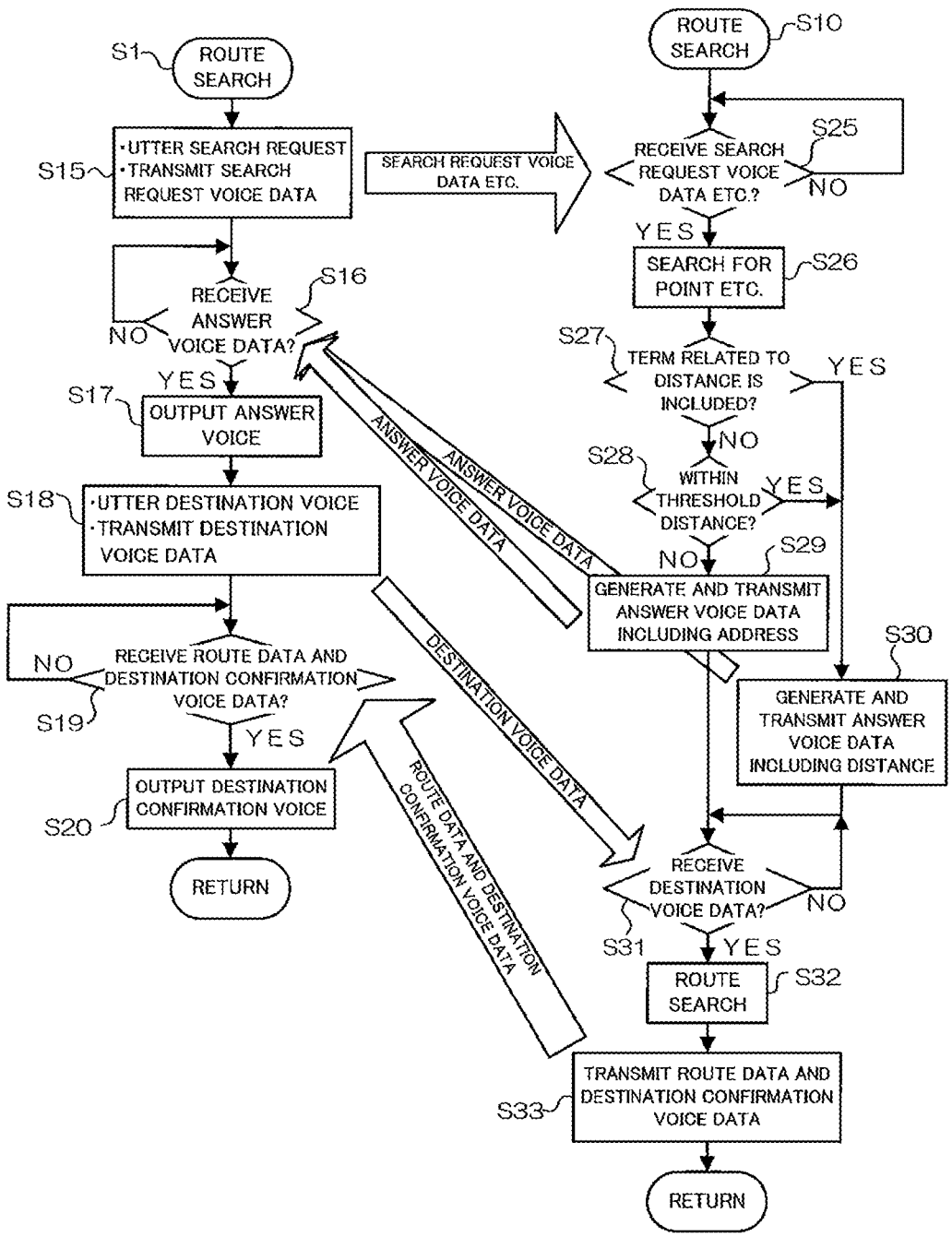
FIG. 5 is a flowchart showing details of navigation processing in an example.

In addition, FIG. 2 is a block figure showing a schematic configuration of a navigation system according to the example. FIG. 3 is a block figure showing a schematic configuration of a terminal device or the like in the example. FIG. 4 is a flowchart showing entire navigation processing in the example. FIG. 5 is a flowchart showing details of the navigation processing. At this time, in FIG. 3, the same reference signs as those of the respective constituent members of the information providing device S are used for constituent elements corresponding to the respective constituent elements of the information providing device S shown in FIG. 1 according to the embodiment.

As shown in FIG. 2, a navigation system SS in the example comprises one or a plurality of terminal devices T1, a terminal device T2, terminal devices T3, . . . , and a terminal device Tn (n is a natural number), a server SV, and a network NW, such as the Internet. Each terminal device is used in a vehicle by a person in the vehicle (more specifically, a driver or a passenger of the vehicle). The network NW connects the terminal device T1, the terminal device T2, the terminal devices T3, . . . , and the terminal device Tn and the server SV in such a manner as to exchange data with each other. Note that the terminal devices T1 to Tn will be collectively referred to as a "terminal device T" in the following description in a case of describing a configuration or the like common to them. At this time, the terminal device T is specifically implemented as, for example, what is called a smartphone or a tablet-type terminal device. In addition, in the following description, the example will be described for a case where a passenger using the terminal device T is in a vehicle that is an example of a moving body.

In this configuration, each terminal device T separately exchanges various types of data with the server SV via the network NW and provides information regarding traveling to the passenger using each terminal device T. The data to be exchanged at this time includes searching data for searching for a route on which the vehicle should travel, route data indicating the route searched for, and guiding data for providing guidance after starting to travel along the route.

Here, for reasons of limitation of the size of the display provided in the terminal device T, limitation of the processing load, avoidance of screen gaze, and the like, the above search for the route and the above guidance on the information regarding the traveling to the passenger in the navigation system SS are performed mainly using voice or sound. Thus, the above searching data to be exchanged between each terminal device T and the server SV includes search request voice data in the example and destination voice data in the example to be transmitted from each terminal device T to the server SV, and, answer voice data in the example and destination confirmation voice data in the example to be transmitted from the server SV to each terminal device T. At this time, the search request voice data in the example is voice data corresponding to a search request voice requesting a search for a point or the like that is a candidate for a destination. In addition, the destination voice data in the example is voice data corresponding to a destination voice uttered by the passenger using the terminal device T and indicating a point or the like finally used as the destination of the above traveling. On the one hand, the answer voice data in the example is voice data corresponding to an answer voice for answering a search result including the destination and the like searched for in the server SV in response to a search request by the above search request voice data to the passenger using the terminal device T that has transmitted the search request voice data. Furthermore, the destination confirmation voice data in the example is voice data for confirming a point or the like finally used as the destination of the above route.

On the other hand, since voice or sound is mainly used for the guidance on the information regarding the above traveling, the above guiding data to be transmitted from the server SV to each terminal device T includes voice data for guidance by the above voice or sound. Note that, in the following description, the voice data for guidance is simply referred to as "guidance voice data".

Next, the configurations and operation of each terminal device T and the server SV will be described with reference to FIG. 3. First, as shown in FIG. 3(*a*), each terminal device T in the example comprises an interface 5, a processing unit 6 constituted by a CPU, a random access memory (RAM), a read only memory (ROM), and the like, a memory 7 including a volatile region and a nonvolatile region, an operation unit 8 constituted by a touch panel, an operation button, and the like, a speaker 9, a sensor unit 10 constituted by a global positioning system (GPS) sensor, an independent sensor, and/or the like, a display 11 constituted by a liquid crystal or organic electro luminescence (EL) display or the like, and a microphone 12. In addition, the processing unit 6 includes a route search unit 6*a* and a guidance voice output control unit 6*b*. At this time, each of a route setting unit 6*a* and the guidance voice output control unit 6*b* may be implemented by a hardware logic circuit including the above CPU and the like constituting the processing unit 6, or may be implemented in a software manner by the CPU and the like loading and executing a program corresponding to a flowchart showing processing as the terminal device T in navigation processing in the example described later.

In the above configuration, the interface 5 controls data exchange with the server SV via the network NW under the control of the processing unit 6. On the one hand, the sensor unit 10 generates sensor data indicating the current position, the traveling speed, the traveling direction, and the like of the terminal device T (in other words, the current position, the traveling speed, the traveling direction, and the like of a passenger using the terminal device T or the vehicle in which the passenger is) using the above GPS sensor and/or the independent sensor, and outputs the sensor data to the processing unit 6. The microphone 12 collects the voice of the passenger using the terminal device T and the sound in the vehicle in which the terminal device T is used, and outputs the sound collection result to the processing unit 6. The passenger's voice collected at this time includes the above search request voice and the above destination voice.

On the other hand, under the control of the processing unit 6, the route search unit 6*a* transmits, as searching data, the above search request voice data (that is, search request voice data requesting a search for a point or the like that is a candidate for a destination to be reached by the vehicle in which the passenger using the terminal device T is), the above destination voice data (that is, destination voice data indicating a point or the like finally used as the destination), and the above sensor data to the server SV via the interface 5 and the network NW. Note that destination data indicating the above final destination may be input from the operation unit 8 and transmitted to the server SV together with the above sensor data. Thereafter, the route search unit 6*a* acquires, from the server SV via the network NW and the interface 5, route data indicating a search result of a route from the current position indicated by the above sensor data to the destination indicated by the above destination voice data or the above destination data.

Thereafter, the processing unit 6 uses the acquired route data to provide guidance on information regarding the traveling of the vehicle along the above route searched for while exchanging the above guiding data (including the above sensor data and the above guidance voice data at that time) with the server SV. At this time, the guidance voice output control unit 6*b* outputs (emits) voice for guidance corresponding to the above guidance voice data acquired from the server SV via the network NW and the interface 5 to the above passenger via the speaker 9.

Concurrently with these, in a case where an input operation of data necessary for guiding the above vehicle in addition to the above destination data is performed at the operation unit 8, the operation unit 8 generates an operation signal corresponding to the input operation and transmits the operation signal to the processing unit 6. As a result, the processing unit 6 executes processing as the terminal device T in the navigation processing in the example while controlling the above route setting unit 6*a* and the above guidance voice output control unit 6*b*. At this time, the processing unit 6 executes the processing while storing data necessary for the processing in the memory 7 temporarily or in a non-volatile manner. In addition, a guide image or the like as an execution result of the processing is displayed on the display 11.

In the meantime, as shown in FIG. 3(*b*), the server SV in the example comprises an interface 20, a processing unit 21 including a CPU, a RAM, a ROM, and the like, and a recording unit 22 constituted by a hard disc drive (HDD), a solid state drive (SSD), or the like. In addition, the processing unit 21 comprises a route setting unit 1 and a guidance voice generation unit 2. At this time, each of the route setting unit 1 and the guidance voice generation unit 2 may be implemented by a hardware logic circuit including the above CPU and the like constituting the processing unit 21, or may be implemented in a software manner by the CPU and the like loading and executing a program corresponding to a flowchart showing processing as the server SV in the navigation processing in the example. Then, the above route search unit 1 corresponds to an example of the acquiring means 1 in the embodiment, and the above guidance voice generation unit 2 corresponds to an example of the providing means 2 in the embodiment. In addition, as indicated by a broken line in FIG. 3(*b*), the above route search unit 1 and the guidance voice generation unit 2 constitute an example of the information providing device S in the embodiment.

In the above configuration, the recording unit 22 stores, in a non-volatile manner, map data 23 necessary for guidance on information regarding traveling of each vehicle in which a passenger using each terminal device T connected to the server SV via the network NW is. At this time, the map data 23 includes road data, point data such as facilities and the like and intersection data to be used for route search and route guidance.

In the meantime, the interface 20 controls data exchange with each terminal device T via the network NW under the control of the processing unit 21. In addition, under the control of the processing unit 21, the route setting unit 1 searches for a point or the like that is a candidate for the destination indicated by the search request voice data and searches for the above route to the destination indicated by the destination voice data using the map data 23 and on the basis of the above search request voice data, the above destination voice data, and the above sensor data acquired from any terminal device T, and transmits the above route data indicating the search result to the terminal device T that has transmitted the above search request voice data, the above destination voice data, and the above sensor data. As a result, the terminal device T provides guidance on a route based on the above route data.

Then, during the guidance, the guidance voice generation unit 2 generates the above guidance voice data in accordance with the guidance timing on the route, and transmits, via the interface 20 and the network NW, the guidance voice data to the terminal device T used by the passenger of the vehicle that is a guiding target. As a result, the voice for guidance corresponding to the guidance voice data is output (emitted) to the above passenger via the speaker 9 of the terminal measure T.

Next, the navigation processing in the example to be executed by the navigation system in the example having the above configuration and function will be specifically described with reference to FIGS. 3 to 5.

The navigation processing in the example is started, for example, when a passenger in a vehicle which is a target for providing information regarding traveling (hereinafter, simply referred to as a "target vehicle") performs a guidance instruction operation or the like for requesting guidance on traveling along a route of the target vehicle (that is, route guidance) at the operation unit 8 of the terminal device T used by the passenger. Note that, in the following description, the terminal device T will be appropriately referred to as a "target terminal device T". Then, as the entire corresponding flowchart is shown in FIG. 4, when the guidance instruction operation is performed at the operation unit 8 of the target terminal device T, the route search unit 6a of the processing unit 6 of the terminal device T exchanges, with the route search unit 1 of the server SV, the above search request voice data, the above answer voice data, the above destination voice data, the above destination confirmation voice data, and the above searching data including the above sensor data, and the above route data to search for a route on which the target vehicle is to travel (step S1). At this time, the route search unit 1 of the server SV always waits for any terminal device T connected to the server SV via the network NW at that time to transmit the above searching data. Then, in the case where the searching data is transmitted from the target terminal device T, the route search unit 1 performs route search based on the search request voice data, the destination voice data, and the like included in the searching data, and transmits the above route data and the above destination confirmation voice data as the search result to the target terminal device T via the network NW (step S10). The route search in the example including the above step S1 and the above step S10 will be described in detail later with reference to FIG. 5.

Thereafter, when guidance on traveling along the route is started by, for example, an operation for starting to travel at the operation unit 8 of the target terminal device T, the processing unit 6 of the target terminal device T and the processing unit 21 of the server SV start guidance along the route searched for in steps S1 and S10 while exchanging the above guiding data including the above sensor data at that time via the network NW (step S2, step S11).

On the one hand, during the guidance on the route started in step S11 (that is, during traveling of the vehicle in which the passenger using the target terminal device T is), the guidance voice generation unit 2 of the server SV monitors whether there is a guidance point (for example, an intersection or the like to turn on the route) on the set route (step S12). In the monitoring in step S12, in the case where there is no guidance point (step S12: NO), the processing unit 21 proceeds to step S14 described later. On the other hand, in the monitoring in step S12, in the case where there is a guidance point (step S12: YES), then the guidance voice generation unit 2 generates guidance voice data having content to provide guidance on the guidance point (for example, "Turn left at the next XX intersection." or the like) at a timing at which guidance on the guidance point should be provided by voice, and transmits the generated guidance voice data to the target terminal device T via the network NW (step S13).

Thereafter, the processing unit 21 determines whether to terminate the route guidance as the navigation processing in the example due to a reason that the target vehicle has reached the destination or the like (step S14). In the case where the route guidance is not terminated in the determination in step S14 (step S14: NO), the processing unit 21 returns to the above step S12 and continues to provide the route guidance. On the one hand, in the case where the route guidance is terminated in the determination in step S14 (step S14: YES), the processing unit 21 simply terminates the route guidance.

On the other hand, after the guidance is started in the above step 2, the guidance voice output control unit 6b of the target terminal device T waits for the server SV to transmit the above guidance voice data (step S3). In the case where the guidance voice data is not transmitted in the waiting in step S3 (step S3: NO), the processing unit 6 of the target terminal device T proceeds to step S5 described later.

On the other hand, in the case where the guidance voice data is received from the server SV in the waiting in step S3 (step S3: YES), the guidance voice output control unit 6b of the target terminal device T outputs (emits) guidance voice corresponding to the received guidance voice data via the speaker 9 (step S4). Thereafter, the processing unit 6 of the target terminal device T determines whether to terminate the route guidance as the navigation processing in the example due to the reason similar to the above step S14 (step SS). In the case where the route guidance is not terminated in the determination in step S5 (step SS: NO), the processing unit 6 returns to the above step S3 and continues to provide the route guidance. On the one hand, in the case where the route guidance is terminated in the determination in step S5 (step S5: NO), the processing unit 6 simply terminates the route guidance.

Next, the route search in the example to be executed by the target terminal device T and the server SV (see step S1 and step S10 in FIG. 4) will be described more specifically with reference to FIG. 5.

As shown in the corresponding flowchart in FIG. 5, in the route search in the example, when a search request voice requesting a search for a point or the like that is a candidate for the destination of traveling is uttered by the passenger to the target terminal device T together with the request of the route search, the search request voice is detected by the microphone 12, and search request voice data corresponding to the search request voice is generated by the route search unit 6a of the target terminal device T. Thereafter, the generated search request voice data is transmitted to the server SV via the network NW together with the sensor data corresponding to that point in time (step S15). Here, examples of the above search request voice are a voice including a specific name of a destination, such as "XX stadium", and a voice indicating the name of a point or the like including a term related to a distance, such as "a nearby YY convenience store" ("nearby" corresponds to the term in this example). In addition, in FIG. 5, the above search request voice data and the above sensor data are collectively referred to as "search request voice data, etc.".

In the meantime, the server SV waits for the target terminal device T to transmit the above search request voice data and the like as the route search in step S10 in FIG. 4 (step S25, step S25: NO). In the case where the above search request voice data and the like are transmitted from the target terminal device T in the waiting in step S25 (step S25: YES), the route search unit 1 of the server SV refers to the map data 23 to search for a point or the like that is a candidate for the destination indicated by the received search request voice data (step S26). Next, the route search unit 1 determines whether the above term related to a distance is included in the above search request voice corresponding to the search request voice data (step S27). In the case where the above term related to a distance is included in the search request voice in the determination in step S27 (step S27: YES), the route search unit 1 refers to the sensor data received in step S25, generates answer voice data corresponding to the answer voice indicating the point or the like searched for including the distance from the current position of the target terminal device T to the point or the like searched for, and transmits the answer voice data to the target terminal device T via the network NW (step S30). Thereafter, the server SV proceeds to step S31 described later.

Here, the answer voice corresponding to the answer voice data generated and transmitted in step S30 is a voice, such as "There is a YY convenience store at ZZ meters from the current position." in a case where the above search request voice is, for example, "a nearby YY convenience store". At this time, the distance included in the answer voice may be a straight line distance from the current position of the target terminal device T to the point or the like searched for in step S26, or may be a distance on a route in a case where the shortest route is taken.

In the meantime, in the case where the above term related to a distance is not included in the search request voice but the specific name or the like of the destination is included in the determination in step S27 (step S27: NO), the route search unit 1 refers to the sensor data received in step S25, and determines whether the distance from the current position of the target terminal device T to the destination searched for is equal to or less than a preset threshold distance (step S28). Here, the threshold distance is a distance that can be recognized as a short distance, for example, 5 kilometers or 10 kilometers in a case where a vehicle travels. Note that, as the navigation processing in the example, in a case where guidance on information regarding traveling when a person traveling on foot or by bicycle is using the target terminal device T is provided, the above threshold distance is, for example, about several hundred meters or one kilometer. At this time, the fact that the traveling is on foot or by bicycle can be determined, for example, by the server SV receiving a voice uttered together with the above search request voice by the person using the target terminal device T together with the above search request voice data, whereby it is preferable to switch the threshold distance depending on the determination as to whether the traveling is traveling by vehicle or the above traveling on foot or by bicycle. Note that, the distance to be determined in step S28 (including the above threshold distance) may be a straight line distance from the current position of the target terminal device T to the point or the like searched for in step S26, or may be a distance on a route in a case where the shortest route is taken. The traveling means (for example, traveling either on foot or by bicycle) may be selected by a user, or may be automatically determined from the traveling distance or speed in the past (for example, within several hours).

In the case where the distance from the current position of the target terminal device T to the point or the like searched in step S26 is equal to or less than the above threshold distance in the determination in step S28 (step S28: YES), the route search unit 1 proceeds to the above step S30, and generates and transmits answer voice data corresponding to the answer voice including the distance from the current position of the target terminal device T. Note that, in the case where the above term related to a distance is included in the above search request voice in the determination in the above step S27 (see step S27: YES), but in the case where the point or the like searched for in the above step S26 is not within the above threshold distance (see step S28), answer voice data corresponding to a voice, such as "There is no YY convenience store nearby, and the closest YY convenience store is located at XX km ahead." may be generated and transmitted.

On the other hand, in the case where the point or the like searched for in step S26 is farther than the above threshold distance from the current position of the target terminal device T in the determination in step S28 (step S28: NO), the route search unit 1 generates answer voice data corresponding to the answer voice indicating the point or the like including the address of the point or the like searched for and transmits the answer voice data to the target terminal device T via the network NW (step S29). Here, the answer voice including the address is, for example, a voice such as "the XX park is in YY town, ZZ city." At this time, information on more detailed address may be included as the address.

On the one hand, after transmitting the search request voice data and the like in the above step S15, the route search unit 6a of the target terminal device T monitors whether the above answer voice data is transmitted from the server SV (step S16, step S16: NO). In the case where the above answer voice data is transmitted in the monitoring in step S16 (step S16: YES), the guidance voice output control unit 6b of the target terminal device T outputs (emits) an answer voice corresponding to the answer voice data via the speaker 9 (step S17). Then, when the passenger utters the name of the destination or the like as a destination voice in response to the answer voice, the microphone 12 detects the destination voice, and the route search unit 6a generates destination voice data corresponding to the destination voice (step S18). The destination voice detected at this time includes a more detailed (or more specific) name of the destination and the like as an answer to the above answer voice. Thereafter, the route search unit 6a transmits the destination voice data to the server SV via the network NW (step S18).

On the other hand, after generating and transmitting the answer voice data in the above step S29 or the above step S30, the route search unit 1 of the server SV monitors whether the above destination voice data is received from the target terminal device T (step S31, step S31: NO). In the case where the above destination voice data is received in the monitoring in step S31 (step S31: YES), the route search unit 1 refers to the map data 23 and the sensor data received in step S25 to search for a route from the current position of the target terminal device T to the destination indicated by the destination voice data by, for example, a method similar to a conventional method (step S32). Then, the route search unit 1 generates route data indicating the route searched for and destination confirmation voice data for confirming the point or the like currently used as the destination of the route, and transmits them to the target terminal device T via the network NW (step S33). Thereafter, the server SV proceeds to step S11 shown in FIG. 4.

In the meantime, the route search unit 6a of the target terminal device T having transmitted the destination voice data in the above step S18 monitors whether the above route data and the above destination confirmation voice data are transmitted from the server SV (step 319, step S19: NO). In the case where the above route data and the above destination confirmation voice data are transmitted in the monitoring in step S19 (step S19: YES), the guidance voice output control unit 6b of the target terminal device T outputs (emits) a destination confirmation voice corresponding to the received destination confirmation voice data to the passenger via the speaker 9 (step S20). The destination confirmation voice in this case is, for example, a voice such as "Heading to the nearby xx convenience store." or "Heading to the XX park in YY town, ZZ city." Thereafter, the target terminal device T proceeds to step S2 shown in FIG. 4.

As described above, according to the navigation processing in the example, an answer voice including information indicating the distance between the position of the target terminal device T and the position of a candidate for a destination is output (emitted) when the candidate is within the preset threshold distance from the position of the target terminal device T (see step S30 and step S17 in FIG. 5), and an answer voice including information indicating the address of the candidate is output (emitted) when the position of the candidate is farther than the threshold distance (see step S29 and step S17 in FIG. 5). Accordingly, it is possible to provide information regarding the guidance to the passenger in an intuitively recognizable manner even in the case of guidance by voice or sound.

At this time, in a case where the distance between the position of the target terminal device T and the position of the candidate and the above threshold distance are linear distances from the position of the target terminal device T, it is possible to provide information regarding the guidance in a more intuitively recognizable manner even in the case of guidance by voice or sound.

On the other hand, in a case where the distance between the position of the target terminal device T and the position of the candidate and the above threshold distance are distances along the traveling route (road) from the position of the target terminal device T, it is possible to provide information regarding the guidance in a recognizable manner using the actual traveling distance even in the case of guidance by voice or sound.

In addition, in the case where the term related to a distance, such as "nearby", is included in the search request voice (see step S27: YES in FIG. 5), an answer voice including information indicating a distance between the position of the candidate for the destination and the position of the target terminal device T is output (emitted) regardless of the relation with the above threshold distance (see step S30 and step S17 in FIG. 5), and in the case where a term other than the above term related to a distance is included in the voice, an answer voice including information indicating the address of the candidate for the destination is output (emitted) (see step S29 and step S17 in FIG. 5). Therefore, it is possible to provide information regarding the guidance to the passenger in an intuitively recognizable manner even in the case of guidance by voice or sound.

Note that, in the answer voice including the distance from the current position of the target terminal device T (see step S30 in FIG. 5), the direction and the like toward the candidate for the destination viewed from the current position may be output as a voice. In this case, it is possible to provide information regarding the guidance in a more intuitively recognizable manner even in the case of guidance by voice or sound.

In addition, in the navigation processing in the above example, the processing unit 21 of the server SV searches for a candidate for the destination (see step S26 in FIG. 5) and generates answer voice data (see step S29 or step S30 in FIG. 5). However, in addition to this, the terminal device T may search for a candidate for the destination and generate answer voice data. In this case, the processing after the route search based on the above destination voice data may be executed by the server SV. In addition, search for a candidate for the destination, generation of answer voice data, route search, and generation of guidance voice data may be executed by a terminal device without using a server, or a part of the processing may be executed by the server in a distributed manner.

Furthermore, regarding the guidance based on the current position, the guidance itself on the route is not essential as described above, and may be simply used to notify the passenger of the positional relation with the search point.

Moreover, display of points using a map is not excluded, but display is not essential, and the example is applicable to a smart speaker or the like that does not include a display unit.

In addition, by recording programs corresponding to the respective flowcharts shown in FIGS. 4 and 5 on a recording medium, such as an optical disk or a hard disk, or acquiring the programs via a network, such as the Internet, and loading the programs on a general-purpose microcomputer or the like and executing the programs, it is also possible to cause the microcomputer to function as the processing unit 6 or the processing unit 21 according to the example.

EXPLANATION OF REFERENCE NUMERALS

1 Acquiring means (Route search unit)
2 Providing means (Guidance voice generation unit)
6, 21 Processing unit
6a Route search unit
6b Guidance voice output control unit
9 Speaker
23 Map data
S Information providing device
T, T1, T2, T3, Tn Terminal device
SV Server
SS Navigation system

The invention claimed is:

1. An information providing device comprising:
a processor coupled to a memory storing instructions to permit the processor to function as:

an acquiring unit that acquires guidance location information indicating a guidance location for which guidance information is to be provided; and a providing unit that provides:
- (i) when a position of the guidance location indicated by the acquired guidance location information is within a preset distance from a position of a recipient who is traveling or will start traveling and who receives provision of the guidance location information, only the guidance information, consisting of distance information indicating a distance between the position of the recipient and the position of the guidance location to the recipient, by sound only; and
- (ii) when the position of the guidance location is farther than the preset distance from the position of the recipient, only the guidance information, consisting of address information indicating an address of the guidance location to the recipient, by sound only, wherein, when the distance between the position of the recipient and the guidance location is determined to be within the preset distance, the guidance information, consisting of the distance information and no address information, is provided by sound only, and wherein, when the distance between the position of the recipient and the guidance location is determined to be farther than the preset distance, the guidance information, consisting of the address information and no distance information, is provided by sound only.

2. The information providing device according to claim 1, wherein each of (i) the preset distance and (ii) the distance between the position of the recipient and the position of the guidance location to the recipient is a straight line distance from the position of the recipient.

3. The information providing device according to claim 1, wherein each of (i) the preset distance and (ii) the distance between the position of the recipient and the position of the guidance location to the recipient is a distance along a traveling route from the position of the recipient.

4. The information providing device according to claim 1, wherein the acquiring unit includes a microphone.

5. The information providing device according to claim 1, wherein the providing unit includes a speaker.

6. The information providing device according to claim 1, wherein the preset distance is automatically determined from a traveling speed of the recipient within a past duration of time.

7. An information providing method performed by an information providing device including an acquiring unit and a providing unit, the information providing method comprising:

an acquiring step, by the acquiring unit, of acquiring guidance location information indicating a guidance location for which guidance information is to be provided; and a providing step, by the providing unit, of providing:
- (i) when a position of the guidance location indicated by the acquired guidance location information is within a preset distance from a position of a recipient who is traveling or will start traveling and who receives provision of the guidance location information, only the guidance information, consisting of distance information indicating a distance between the position of the recipient and the position of the guidance location to the recipient, by sound only; and
- (ii) when the position of the guidance location is farther than the preset distance from the position of the recipient, only the guidance information consisting of address information indicating an address of the guidance location to the recipient by sound only, wherein, when the distance between the position of the recipient and the guidance location is determined to be within the preset distance, the guidance information, consisting of the distance information and no address information, is provided by sound only, and wherein, when the distance between the position of the recipient and the guidance location is determined to be farther than the preset distance, the guidance information, consisting of the address information and no distance information, is provided by sound only.

8. A non-transitory computer-readable storage medium encoded with an information providing program causing a computer to function as:

an acquiring unit that acquires guidance location information indicating a guidance location for which guidance information is to be provided; and a providing unit that provides:
- (i) when a position of the guidance location indicated by the acquired guidance location information is within a preset distance from a position of a recipient who is traveling or will start traveling and who receives provision of the guidance location information, only the guidance information consisting of distance information, indicating a distance between the position of the recipient and the position of the guidance location to the recipient, by sound only; and
- (ii) when the position of the guidance location is farther than the preset distance from the position of the recipient, only the guidance information consisting of address information indicating an address of the guidance location to the recipient by sound only, wherein, when the distance between the position of the recipient and the guidance location is determined to be within the preset distance, the guidance information, consisting of the distance information and no address information, is provided by sound only, wherein, when the distance between the position of the recipient and the guidance location is determined to be farther than the preset distance, the guidance information, consisting of the address information and no distance information, is provided by sound only.

* * * * *